(12) United States Patent
Kim et al.

(10) Patent No.: US 7,843,710 B2
(45) Date of Patent: Nov. 30, 2010

(54) APPARATUS AND METHOD FOR CONTROLLING POWER CONVERTER

(75) Inventors: Jin-ha Kim, Seongnam-si (KR); Joong-gi Kwon, Gunpo-si (KR); Young-min Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/588,903

(22) Filed: Nov. 2, 2009

(65) Prior Publication Data
US 2010/0046257 A1    Feb. 25, 2010

Related U.S. Application Data

(63) Continuation of application No. 11/337,592, filed on Jan. 24, 2006, now Pat. No. 7,646,619.

(30) Foreign Application Priority Data
Jun. 17, 2005   (KR) ...................... 10-2005-0052588

(51) Int. Cl.
    *H02M 7/122*      (2006.01)
(52) U.S. Cl. ....................................... 363/55
(58) Field of Classification Search .................... 363/17, 363/55, 56.02, 56.03, 56.04, 56.05, 57, 58, 363/98, 132, 136
See application file for complete search history.

(56) References Cited

U.S. PATENT DOCUMENTS

| 4,356,542 | A | 10/1982 | Bruckner et al. |
| 4,363,064 | A | 12/1982 | Billings et al. |
| 4,630,187 | A | 12/1986 | Henze |
| 4,725,940 | A | 2/1988 | Henze |
| 6,356,423 | B1 | 3/2002 | Hastings et al. |
| 6,459,555 | B1 | 10/2002 | Welbers et al. |
| 6,791,809 | B2 | 9/2004 | Pannwitz |
| 6,813,124 | B1 | 11/2004 | Pierson |
| 7,646,619 | B2 * | 1/2010 | Kim et al. ..................... 363/55 |
| 2003/0025480 | A1 | 2/2003 | Pannwitz |
| 2005/0078024 | A1 | 4/2005 | Harrington |

FOREIGN PATENT DOCUMENTS

| CN | 2494570 Y | 6/2002 |
| JP | 11-234892 | 8/1999 |

* cited by examiner

*Primary Examiner*—Adolf Berhane
(74) *Attorney, Agent, or Firm*—Roylance, Abrams, Berdo & Goodman, L.L.P.

(57) ABSTRACT

A power converter controlling apparatus that can prevent burnout caused by overcurrent and/or overvoltage generated by low power index operation or output short circuit in a high frequency power converter employing a digital controlling method, and a method thereof. The power converter controlling apparatus includes a digital controller which outputs a gate signal for controlling intermittent operation of a predetermined switch based on inputted control data, a detector which generates a detection signal in response to generation of overcurrent and/or overvoltage, and a registration maintenance unit for maintaining a state where the output of the gate signal is shut off, when the detection signal is generated.

13 Claims, 4 Drawing Sheets

APPARATUS AND METHOD FOR CONTROLLING POWER CONVERTER

CROSS-REFERENCE TO RELATED APPLICATIONS

This application is a continuation of U.S. patent application Ser. No. 11/337,592, filed on Jan. 24, 2006, now U.S. Pat. No. 7,646,619, which in turns claims the benefit under 35 U.S.C. §119(a) from Korean Patent Application No. 2005-52588 filed Jun. 17, 2005 in the Korean Intellectual Property Office, the entire disclosure of which is hereby incorporated by reference.

BACKGROUND OF THE INVENTION

1. Field of the Invention

The present invention relates to an apparatus and method for controlling a power converter. More particularly, the present invention relates to a power converter controlling apparatus that can prevent burnout caused by overcurrent and/or overvoltage generated by low power index operation or output short circuit in a high frequency power converter employing a digital controlling method, and a method thereof.

2. Description of the Related Art

Generally, a power converter such as an inverter uses a semiconductor device, for example, Metal-Oxide Semiconductor Field Effect Transistor (MOSFET) for power, as a switch, and it controls the amplitude of output voltage through the intermittent on/off operation. Herein, an apparatus for controlling the intermittent operation of the switch, such as a power converter controlling apparatus, can be analog or digital. An analog power converter controlling apparatus has an advantage in that it can perform control at a faster speed. However, since the analog power converter controlling apparatus has a fixed circuit, it cannot be equipped with diverse functions, as compared to a digital power converter controlling apparatus.

FIG. 1 presents an example of a system employing a power converter. It shows an image forming apparatus having a Direct Current/Alternating Current (DC/AC) inverter 30 using a digital controlling apparatus. In FIG. 1, an AC/DC rectifier 20 rectifies power source voltage and outputs DC voltage, and the DC/AC inverter 30 receives the DC voltage from the AC/DC rectifier 20, generates high voltage and provides the high voltage to a charged roller 40. Herein, a controlling apparatus 50 controls a duty rate of gate signals which control the intermittent operation of a switch in order to maintain a phase margin and a real/apparent power ratio at a uniform level based on a resonance frequency by using a Phase Loop Lock (PLL) method for increased instantaneous power control and power conversion efficiencies. The DC/AC inverter 30 is equipped with an environment checking mode for checking a minimum power transmission environment, when an output end is short. If a minimum power transmission condition is not fulfilled, the gate signals are pre-scanned at a maximum frequency.

FIG. 2 is a circuit diagram illustrating a conventional power converter controlling apparatus. Referring to FIG. 2, the output voltage or output current measured by diodes D1 to D4, a resistor R1, and a capacitor C1 at the output end of a power converter is transmitted to a digital controller 51 through rectification and AC/DC conversion processes. The digital controller 51 outputs gate signals for controlling the intermittent operation of a switch based on the transmitted signals.

However, when overcurrent flows through a MOSFET, which is used as a switch, due to output short circuit and the like, a main switch 53 providing the switch or operation power heats up. The generation of heat degrades the main switch 53 to be burnt out. Time taken for the main switch 53 to reach the burnout is in proportion to the quantity of energy. In case of a high capacity power converter, the main switch 53 can burn out within tens of minutes or seconds.

In the conventional methods, the switch or the main switch 53 is protected from heat generated from overcurrent and/or overvoltage by using a thermosensor. However, the protection of the main switch by the thermosensor or a program has a limitation in reliability and increases costs based on insulation.

SUMMARY OF THE INVENTION

It is, therefore, an object of the present invention to provide a power converter controlling apparatus that can protect a power converter operating through high-capacity fast switching from overcurrent and/or overvoltage, and a method thereof.

In accordance with an exemplary aspect of the present invention, there is provided a power converter controlling apparatus comprising a digital controller which outputs a gate signal for controlling intermittent operation of a predetermined switch based on input control data, a detector which generates a detection signal in response to generation of overcurrent and/or overvoltage, and a registration maintenance unit for maintaining a state where the output of the gate signal is shut off, when the detection signal is generated. According to an exemplary implementation, the power converter controlling apparatus further comprises a registration revocation unit for revoking the state where the output of the gate signal is shut off according to control of the digital controller.

The detector can generate the detection signal based on reverse voltage characteristics of a control diode. According to an exemplary implementation, the power converter controlling apparatus further includes a measurement unit for measuring information for power instantaneous control and providing the measured information as the control data.

In accordance with another exemplary aspect of the present invention, there is provided a method for controlling a power converter controlling output voltage through intermittent operation of a switch, the method comprising outputting a gate signal for controlling intermittent operation of the switch based on inputted control data, detecting generation of overcurrent and/or overvoltage, and maintaining a state where the output of the gate signal is shut off, when overcurrent and/or overvoltage is generated. According to an exemplary implementation, the method further comprises revoking the state where the output of the gate signal is shut off.

According to another exemplary implementation, the method further comprises measuring information corresponding to the output voltage and providing the measured information as the control data.

BRIEF DESCRIPTION OF THE DRAWINGS

The above aspects and features of the present invention will be more apparent by describing certain exemplary embodiments of the present invention with reference to the accompanying drawings, in which like reference numerals will be understood to refer to like parts, components and structures, where.

DETAILED DESCRIPTION OF EXEMPLARY EMBODIMENTS

Figure 1:
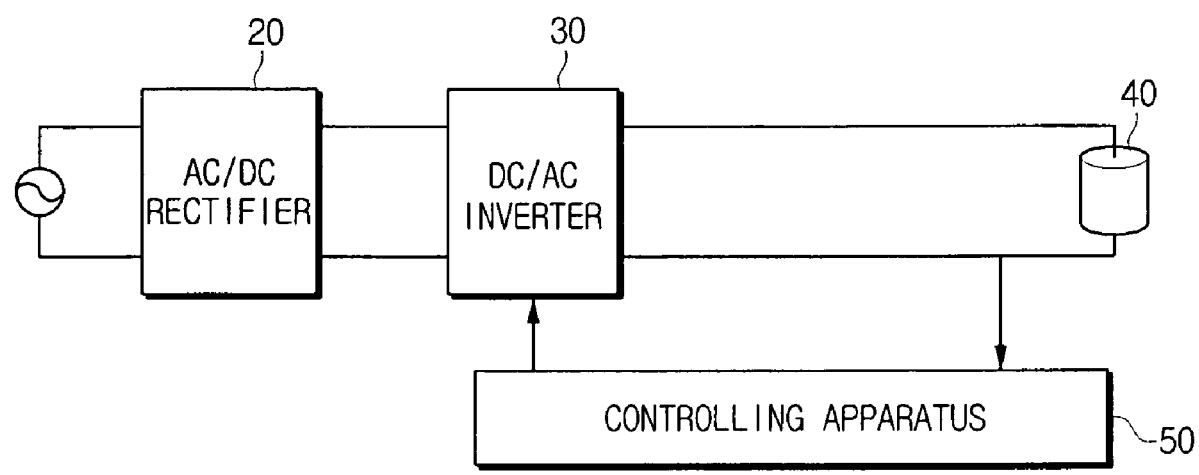
FIG. 1 is a block diagram showing an example of a system employing a power converter.
Figure 2:
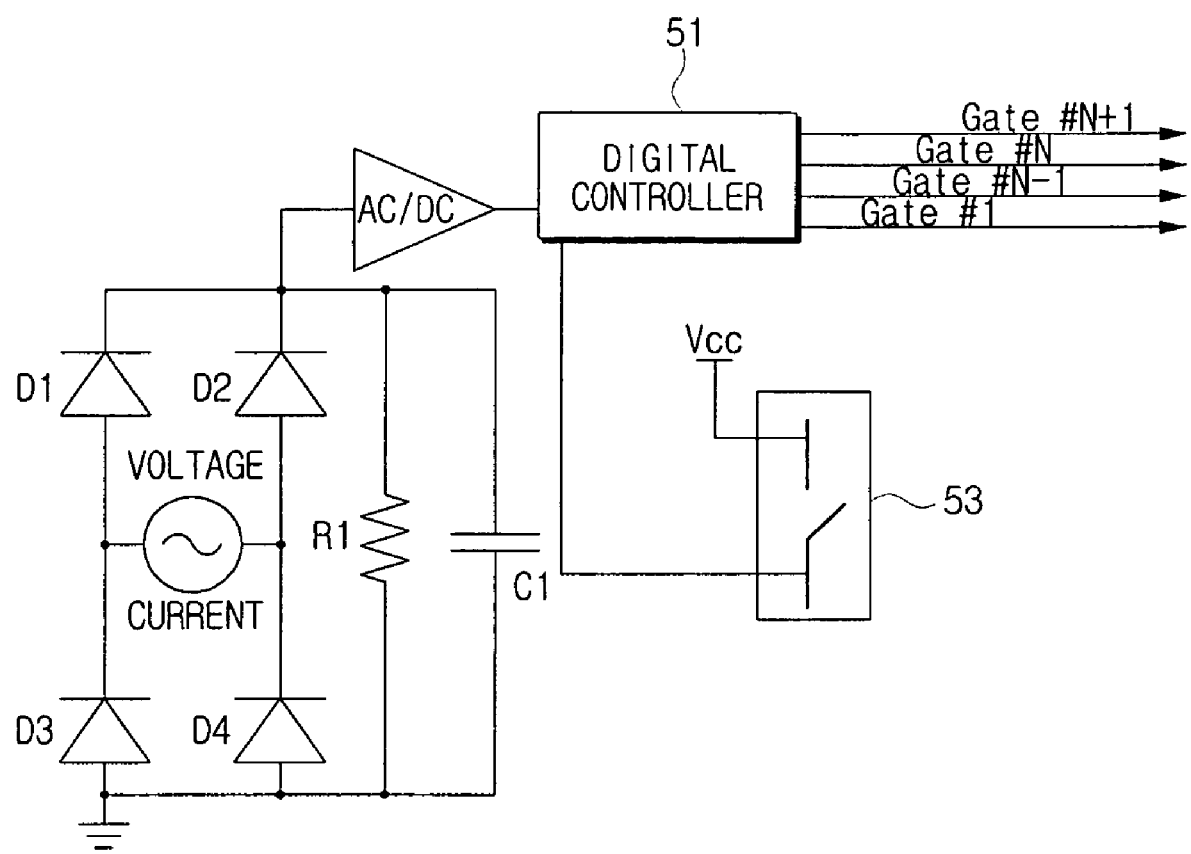
FIG. 2 is an exemplary circuit diagram describing a conventional power converter controlling apparatus.

Certain exemplary embodiments of the present invention will be described in greater detail with reference to the accompanying drawings.

In the following description, same drawing reference numerals are used for the same elements in different drawings, as noted above. The matters defined in the description such as a detailed construction and elements are provided to assist in a comprehensive understanding of the invention. One of ordinary skill in the art will appreciate that other implementations of the present invention can be carried out without strict adherence to the detained description of the examples set forth below. Also, well-known functions or constructions are not described in detail for clarity and conciseness.

Figure 3:
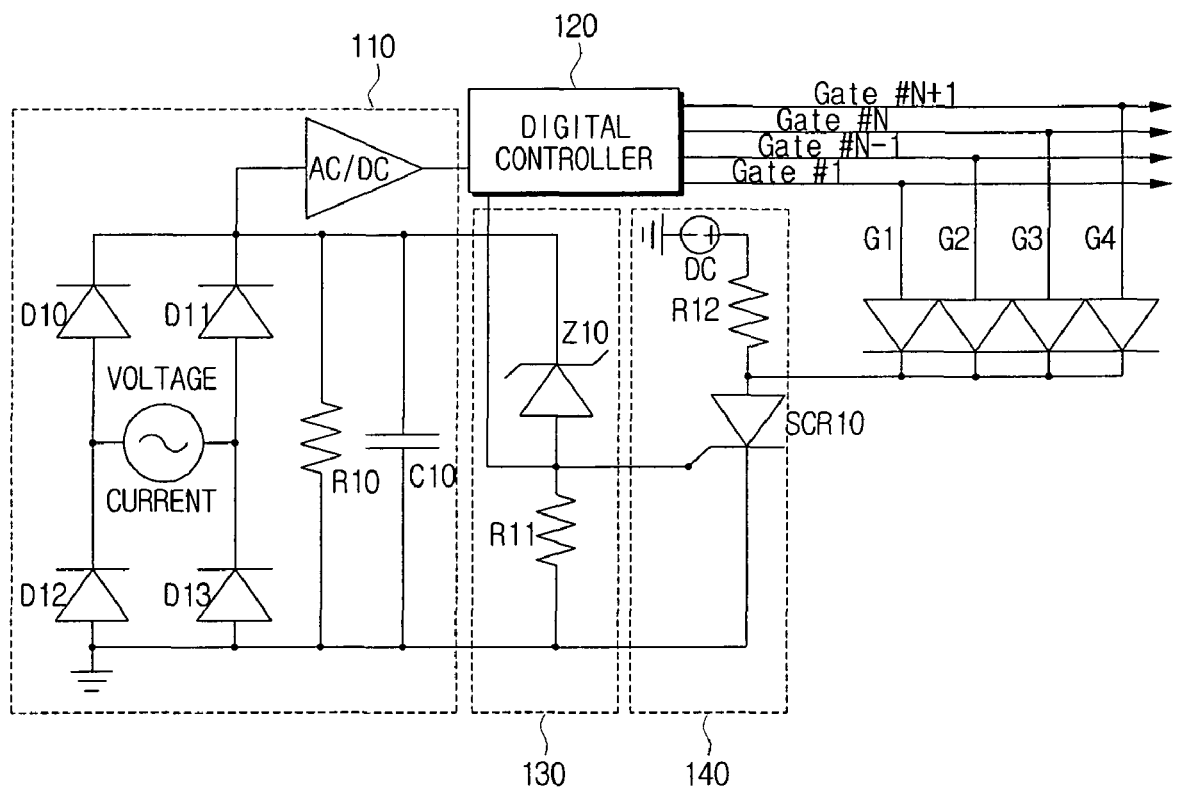
FIG. 3 is a circuit diagram illustrating a power converter controlling apparatus in accordance with an exemplary embodiment of the present invention.

FIG. 3 is a circuit diagram illustrating a power converter controlling apparatus in accordance with an embodiment of the present invention. Referring to FIG. 3, the power converter controlling apparatus includes a measurement unit 110, a digital controller 120, a detector 130, and a registration maintenance unit 140.

The measurement unit 110 measures voltage or current from an output end of a power converter for instantaneous power control, rectifies the voltage or current, performs AC/DC conversion, and outputs a Direct Current (DC) voltage value obtained after the AC/DC conversion.

The digital controller 120 utilizes the DC voltage value outputted form the measurement unit 110 as a control value and generates gate signals used for on/off switching of a switch. Herein, the amplitude of the output voltage is varied according to the duty rate of the gate signals.

The detector 130 includes a Zener diode Z10 and a resistor R11 which are connected in series, and it detects an overcurrent or overvoltage based on reverse voltage characteristics of the Zener diode.

The registration maintenance unit 140 includes a silicon controlled rectifier SCR 10, and a resistor R12, and it maintains the detector in the state where overcurrent or overvoltage is detected and the gate signals are shut off. In short, since the silicon controlled rectifier SC10 cannot flow current in the turn-off state, diodes G1 to G4 maintain the off state based on direct voltage connected to one end of the resistor R12, and the gate signal are outputted from the digital controller 120. However, when pulse current generated by overvoltage or overcurrent is inputted into a gate end of the silicon controlled rectifier SCR10 through the Zener diode Z10 or the digital controller 120, the silicon controlled rectifier SCR10 is turned on and it can flow forward current from an anode to a cathode. As a result, the diodes G1 to G4 are turned on to thereby shut off the output of gate signals. Also, when the silicon controlled rectifier SCR10 is turned on, the turn-on state is maintained although the gate signals inputted into a gate end is removed. Therefore, the gate signals are maintained to be shut off.

According to the above-described structure, the gate signals outputted from the digital controller 120 can be automatically shut off in the respect of hardware when overcurrent and/or overvoltage is generated. Therefore, the generation of heat can be prevented in a switch.

Figure 4:
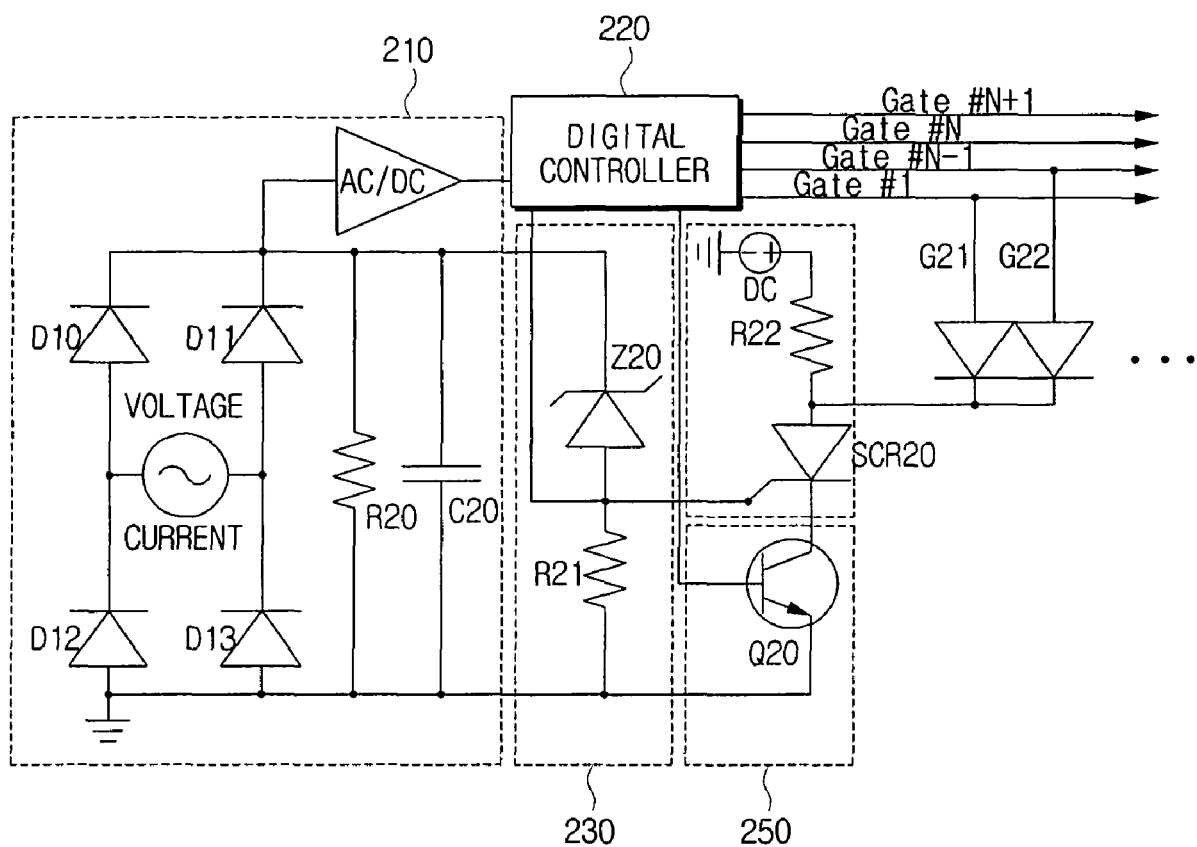
FIG. 4 is a circuit diagram describing a power converter controlling apparatus in accordance with another exemplary embodiment of the present invention.

FIG. 4 is a circuit diagram describing a power converter controlling apparatus in accordance with another embodiment of the present invention. Referring to FIG. 4, the power converter controlling apparatus includes a measurement unit 200, a digital controller 220, a detector 230, a registration maintenance unit 240, and a registration revocation unit 250.

The functions and operations of the measurement unit 200, the digital controller 220, the detector 230 and the registration maintenance unit 240 are the same as those described with reference to FIG. 3. The present embodiment features the registration revocation unit 250 for performing revocation while maintaining the shut-off state of gate signals in the registration maintenance unit 240.

When pulse current caused by overvoltage or overcurrent is applied to a gate of a silicon controlled rectifier SCR20 to thereby turn on the silicon controlled rectifier SCR20, the turn-on state is maintained although the voltage applied to the gate end is removed. In order to turn off the silicon controlled rectifier SCR20, an anode voltage should become 0 or a minus value. When a revocation signal is supplied from the digital controller 220 to a base of a transistor Q20, the transistor Q20 of the registration revocation unit 250 is turned off and, accordingly, the silicon controlled rectifier SCR20 is turned off. The turn-off of the silicon controlled rectifier SCR20 converts diodes G21 and G22 from the on state into the off state. Therefore, the gate signals which have been shut off can be outputted.

The above two embodiments control the output of two gate signals for the sake of convenience, it is possible to control the output of more gate signals in the same methods.

As described above, the technology of the present invention can protect a power converter operated through high-capacity fast switching from error-causing environments such as overcurrent and overvoltage. Also, it can shut off output voltage caused by overcurrent and/or overvoltage in the respect of hardware, it can prevent burnout caused by the generation of heat. Therefore, the present invention can improve reliability in the error-causing environments and prevent possible exchange of parts.

The foregoing embodiment and advantages are merely exemplary and are not to be construed as limiting the present invention. The present teaching can be readily applied to other types of apparatuses, and many alternatives, modifications, and variations will be apparent to those skilled in the art. Accordingly, the description of the exemplary embodiments of the present invention is intended to be illustrative, and not to limit the scope of the invention which is defined in the following claims and their equivalents.

What is claimed is:

1. A power converter for an image forming apparatus, comprising:

an AC/DC rectifier which rectifies power source voltage and outputs DC voltage;

an DC/AC inverter which is coupled to an output terminal of the AC/DC rectifier, inverts the DC voltage from the AC/DC rectifier to high voltage, and outputs the high voltage to a load of the image forming apparatus using a switch; and a controlling apparatus which controls operation of the switch of the DC/AC inverter;

wherein the controlling apparatus comprises:

a first circuit unit which is coupled to an output terminal of the power converter and generates a control signal based on voltage or current output by the power converter;

a digital controller which outputs a gate signal for controlling intermittent operation of the switch of the inverter based on the control signal;

a second circuit unit which is coupled to the output terminal of the power converter, detects at least one of overcurrent and overvoltage of the output terminal of the power converter and generates a detection signal based on detection of at least one of overcurrent and overvoltage;

a third circuit unit which receives the detection signal from the second circuit unit, and automatically shuts off an output of the gate signal using hardware when the detection signal is generated; and a fourth circuit unit which revokes a state where the output of the gate signal is shut off according a revocation signal of the digital controller.

2. The power converter as recited in claim 1, wherein the second circuit unit is directly connected to the output terminal of the power converter.

3. The power converter as recited in claim 1, wherein the digital controller checks for a presence of at least one of an overcurrent condition and an overvoltage condition of the power converter based on the control signal received from the first circuit unit, when the detection signal is generated by the second circuit unit.

4. The power converter as recited in claim 3, wherein the digital controller generates the revocation signal, when the overcurrent condition and the overvoltage condition are no longer present.

5. The power converter as recited in claim 4, wherein the digital controller checks an operation state of the switch, when the overcurrent condition and the overvoltage condition are no longer present.

6. The power converter as recited in claim 1, wherein the second circuit unit comprises:
  a Zener diode; and
  a resistor connected in series with the Zener diode;
  wherein the second circuit unit detects at least one of the overcurrent and the overvoltage based on reverse voltage characteristics of the Zener diode.

7. The power converter controlling apparatus as recited in claim 1, wherein the third circuit unit comprises:
  a silicon controlled rectifier to receive the detection signal, wherein the silicon controlled rectifier is turned on when the detection signal is received to shut off the output of the gate signal.

8. A method for controlling a power converter of an image forming apparatus, the method comprising:
  generating a control signal based on voltage or current output by the power converter of the image forming apparatus;
  using a digital controller to output a gate signal for controlling intermittent operation of a switch based on the control signal;
  detecting at least one of overcurrent and overvoltage of an output terminal of the power converter and generating a detection signal based on detection of at least one of overcurrent and overvoltage;
  automatically shutting off an output of the gate signal using hardware in response to the generation of the detection signal; and
  revoking a state where the output of the gate signal is shut off according a revocation signal of the digital controller.

9. The method as recited in claim 8, further comprising:
  using the digital controller to check for a presence of at least one of an overcurrent condition and an overvoltage condition of the power converter based on the control signal, when the detection signal is generated.

10. The method as recited in claim 8, further comprising:
  using the digital controller to generate the revocation signal when the overcurrent condition and the overvoltage condition are no longer present.

11. The method as recited in claim 10, further comprising:
  using the digital controller to check an operation state of the switch, when the overcurrent condition and the overvoltage condition are no longer present.

12. The method as recited in claim 8, wherein the generating the detection signal comprises:
  detecting at least one of the overcurrent and overvoltage based on reverse voltage characteristics of the Zener diode.

13. The method as recited in claim 8, wherein shutting off the output of the gate signal is performed by using a silicon controlled rectifier which receives detection signal.

* * * * *